W. J. MOORE & F. M. THAYER.
STEERING GEAR FOR AUTOMOBILES.
APPLICATION FILED MAR. 14, 1914.
1,144,307.   Patented June 22, 1915.
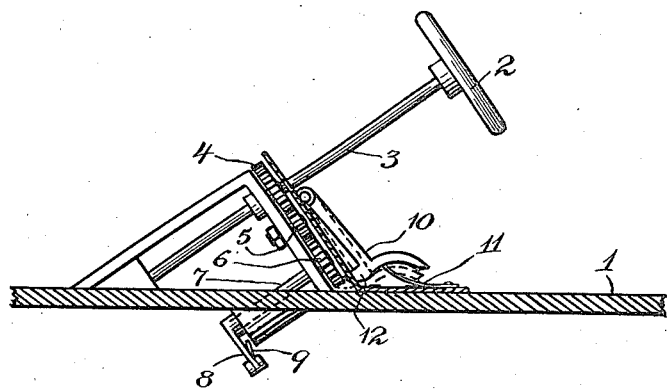
Witnesses
P. G. French
A. W. Snowdon
Inventors
William J. Moore
Franklin M. Thayer
By Ithiel J. Cilley
Attorney

UNITED STATES PATENT OFFICE.

WILLIAM J. MOORE, OF CEDAR SPRINGS, AND FRANKLIN M. THAYER, OF GRAND RAPIDS, MICHIGAN.

STEERING-GEAR FOR AUTOMOBILES.

1,144,307.  Specification of Letters Patent.  Patented June 22, 1915.

Application filed March 14, 1914. Serial No. 824,812.

*To all whom it may concern:*

Be it known that we, WILLIAM J. MOORE and FRANKLIN M. THAYER, citizens of the United States, residing, respectively, at Cedar Springs and Grand Rapids, in the county of Kent and State of Michigan, have invented certain new and useful Improvements in Steering-Gears for Automobiles, of which the following is a specification.

Our invention relates to improvements in steering gears for automobiles, and its objects are: First, to provide an automobile steering gear with which sudden jerking of the running gear by reason of striking an obstacle in the road, will not be transmitted directly to the steering wheel and thus cause a sudden, unpleasant jerking of the lever or steering wheel in the hands of the operator. Second, to provide a means whereby the steering gear may be locked in any desired position to cause the automobile to run continuously in the one direction, and, also, to avert the danger of sudden sidewise movement. We attain these objects by the mechanism illustrated in the accompanying drawing wherein the single figure is deemed sufficient to fully illustrate the invention.

Similar letters refer to similar parts throughout the drawing.

In the single figure herewith shown, 1 represents the floor of the automobile.

2 represents the steering lever or wheel, and 3 represents the steering shaft, which mechanism is applied to the frame of the automobile similar to its application in the ordinary steering gears on vehicles of this class, except that the steering arm, or arm 8, is not directly connected with the shaft 3, but, is connected with a separate shaft, 7 which is placed to one side of the shaft 3 and is connected therewith by a train of gear wheels, 4, 5, and 6, in such a manner that the gear wheel 4, acting on the idler wheel 5, and through said idler, upon the gear wheel 6, will cause the shaft 7 to turn the same direction that the shaft 3 is turned, thus making the action upon the lever 2 exactly the same in the handling of the steering gear of the vehicle, as if the crank or lever 8 were connected directly with the shaft 3, except that any sudden jerk or jar upon the running gear of the vehicle is greatly modified by passing through the gears 6, 5, 4 so that the effect of the jar is scarcely perceptible at the steering wheel or lever 2.

9 is the connecting rod that connects the lever 8 with the corresponding lever on the hubs of the forward wheels of the automobile, (not shown in the drawing, as it is not directly connected with the invention desired to be covered,) but simply a continuous element in the general application of the invention to the vehicle.

Our appliance for locking the steering gear in the desired position consists of a latch 10, or its equivalent, so located and arranged that when the desired position has been attained the latch may be pressed downward, as indicated by its dotted lines, and the lip 12 will pass between two of the teeth on the gear wheel 6, (or such other like gear wheel as convenience and the construction of the vehicle may demand) and will lock the gear securely in place until the latch has been released and allowed to become disconnected from the gear wheel. This latch is actuated to hold it in normal position, out of engagement with the teeth of the gear wheel, by any available form of spring, as indicated at 11.

It will be readily understood that if a driver is on a straight way course, or road, and has once attained the desired course he may lock the steering gear in place and allow the vehicle to run for a considerable distance without having to hold the arms under strain in an endeavor to properly guide it, and at the same time it is perfectly easy and natural for him to remove his foot from the latch and bring the vehicle again under the direct control of the steering wheel 2 the same as if the locking device was not attached. If, on the other hand, the automobile is being driven upon a smooth hard road and suddenly passes into a soft, sandy road it is liable to be jerked to one side or the other so suddenly as to carry the steering gear out of control of the driver. In such cases it is necessary to regain control of the steering gear at the earliest possible moment, and to avert the danger of the gear getting too much out of the control of the driver we find it very advantageous for the driver to lock the gear safely with the latch 10 until it can be again brought under the perfect control of the driver.

What we claim as new, and desire to se- cure by Letters Patent of the United States, is:

In combination with the steering shaft of an automobile, having its lower end stepped on the floor of the automobile, said shaft stationed at an incline from the perpendicular toward the operator, a gear wheel mounted on the steering shaft near the floor, an auxiliary shaft parallel with the steering shaft, a gear wheel mounted on said shaft, an idler gear wheel pivotally mounted between the gear wheels on the steering shaft and the idler shaft in position to mesh with both these gear wheels to transmit the revoluble movements of the steering shaft to the auxiliary shaft in the same direction, a casing covering said gear wheels, a latch pivotally connected with said casing in position to be made to readily engage one of the gear wheels and lock the steering shafts in the desired position, by the foot of the operator, and a spring to hold the latch normally out of engagement with the gear wheels.

Signed at Grand Rapids Michigan March 11 1914.

WILLIAM J. MOORE.
FRANKLIN M. THAYER.

In presence of—
  I. J. CILLEY,
  CHAS. V. HILDING.